United States Patent Office 3,067,490
Patented Dec. 11, 1962

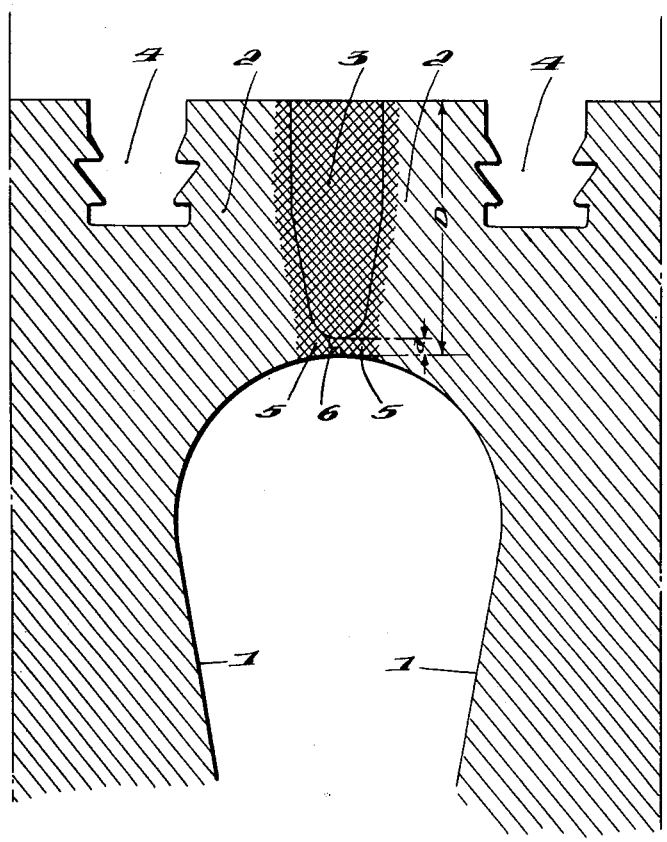

3,067,490
PROCESS FOR THE PRODUCTION OF TURBINE ROTORS WELDED FROM SINGLE PARTS
Adolf Lüthy, Baden, and Piero Hummel, Wettingen, Switzerland, assignors to Aktiengesellschaft Brown, Boveri & Cie, Baden, Switzerland, a stock company of Switzerland
Filed Feb. 24, 1958, Ser. No. 717,203
Claims priority, application Switzerland Mar. 11, 1957
1 Claim. (Cl. 29—156.8)

This invention relates to the art of forming rotors of turbines, axial compressors and the like, and is concerned with an improved welding procedure for forming such rotors and also with welded rotors so produced.

The rotors of turbo machines, such, for example, as the rotors of steam and gas turbines or axial compressors, are known to be produced by welding together the outer circumferences of the rims of rotor parts arranged in series. This process was based on the assumption that, in view of the grooves provided to receive the blade roots, such rotors require rims whose thickness is greater than the depth of the welded groove provided for reasons of strength. After the welding of the rotor parts it was no longer possible to examine such a welded seam—ending somewhere between the outer and inner circumference of the rims—at its inner base and to re-weld it if necessary. In order to make the inner base of such welded seams uniform, and at the same time to facilitate the assembly of the rotor from its single parts before the welding, the welded parts were supported with centering or welding edges on a centering ring arranged on the inner circumference of the welded seam to be produced; or, an elastic hollow ring was provided at this point between the rims of adjacent rotor parts, on whose outer side the welding material was so applied that this hollow ring was included in the welding, contributing to the formation of the inner end of the welded seam. The assembly of the rotor is facilitated by a comparatively large dove-tail connection, arranged somewhere between the outer and inner circumference of the rims.

With constantly increasing standard output of large turbines and compressors and constantly increasing pressures and temperatures, it was found that the mere welding of the outer circumference of the rims was no longer sufficient for the transmission of the forces occurring in the rotors. It was also found that, in spite of the use of rings serving as a support for the welding, the gap formed by the dove-tail within the welded seam between the end faces of the rims could cause cracks in the welding.

The present invention concerns, therefore, a process for the production of turbine rotors welded from single parts, which procedure avoids the disadvantages of the present method, practically eliminates the danger of cracking, and simplifies the construction of large rotors for heavy-duty turbines. It is characterized in that thick rims of the parts to be welded together are provided on their inner circumference in axial direction first with thin welding lips, whose thickness is not greater than 10% of the rim thickness, these welding lips being provided with centering means in the form of telescoping or overlapping cylindrical lip end portions; that the component parts are assembled with said lip end portions interfitting to provide a welding groove between adjacent parts; that these welding lips are welded subsequently by means of protective gas welding; and in that the welding groove is filled with welding metal (in a manner well known per se) up to the outer circumference of the rims, so that finally the rims are joined in their entire thickness by a homogenous welded seam. A turbine rotor produced according to the process of the invention, which is also a subject of the invention, is characterized by homogenously welded seams between the rims of the parts to be welded together.

The single FIGURE of drawing shows in a section through an axial plane of a rotor an embodiment of a weld on a turbine rotor produced according to the invention. The process according to the invention is also illustrated by way of the following example on the basis of the drawing.

Two steel rotor parts 1, 1 are connected at their rims 2, 2 by the welded seam 3. The weld is located between two blade root grooves 4, 4. In the production of the rotor, the thick rims 2, 2 of the parts to be welded are first provided at their inner circumference and in axial direction with thin welding lips 5, 5 whose thickness "$d$" is not greater than at most 10% of the rim thickness "$D$." The confronting end portions of these welding lips are provided at the same time with a centering means in the form of telescoping or overlapping cylindrical lip portions 6, which facilitates the assembly of the rotor components before the welding operations. Afterwards these welding lips are welded by means of protective gas welding, with the interfitted end portions of the lips also included in the welding. Thus a good base is obtained at the inner circumference of the rims to be welded for the further formation of the welded seam. The welding groove is then filled with welding metal (in known manner) up to the outer circumference of the rims, the rims of the parts to be welded being thus finally joined by a homogenous welded seam over their entire thickness. Such a welded seam is no longer jeopardized by cracks starting from the gap, which an unwelded overlapped connection must be considered to be.

We claim:

Process of producing a turbine rotor from thick-rimmed component parts, which comprises providing on confronting faces of the thick rims of the component parts thin welding lips located adjacent the inner circumference of said rims and in axial direction, said welding lips having a thickness not greater than 10% of the rim thickness and terminating in centering telescoping or overlapping cylindrical end projections, assembling said component parts with said projections interfitting to provide a welding groove between adjacent parts, welding the thin welding lips including said overlapping cylindrical end projections by protective gas welding providing at the inner circumference of the rims to be welded a base for the further formation of a welded seam, and thereafter filling the welding groove with welding metal to join said component parts by a homogenous welded seam extending the entire thickness of said parts so as to form a smooth surface with said parts.

References Cited in the file of this patent

UNITED STATES PATENTS

| | | |
|---|---|---|
| 2,179,556 | Lysholm | Nov. 14, 1939 |
| 2,288,433 | Boetcher et al. | June 30, 1942 |
| 2,317,092 | Allen | Apr. 20, 1943 |
| 2,384,919 | Huber | Sept. 18, 1945 |
| 2,438,867 | Rockwell et al. | Mar. 30, 1948 |
| 2,440,933 | Cunningham | May 4, 1948 |
| 2,450,493 | Strub | Oct. 5, 1948 |
| 2,555,924 | Faber | June 5, 1951 |
| 2,819,517 | Pursell | Jan. 14, 1958 |

FOREIGN PATENTS

| | | |
|---|---|---|
| 706,464 | Great Britain | Mar. 31, 1954 |

UNITED STATES PATENT OFFICE
CERTIFICATE OF CORRECTION

Patent No. 3,067,490 December 11, 1962

Adolf Lüthy et al.

It is hereby certified that error appears in the above numbered patent requiring correction and that the said Letters Patent should read as corrected below.

Column 2, line 51, for "homogenous" read -- homogeneous --.

Signed and sealed this 21st day of May 1963.

(SEAL)
Attest:

ERNEST W. SWIDER
Attesting Officer

DAVID L. LADD
Commissioner of Patents